April 26, 1938.   R. N. PIERSON ET AL   2,115,176
BAG INTUCKING MACHINE
Filed Aug. 9, 1937   11 Sheets-Sheet 6

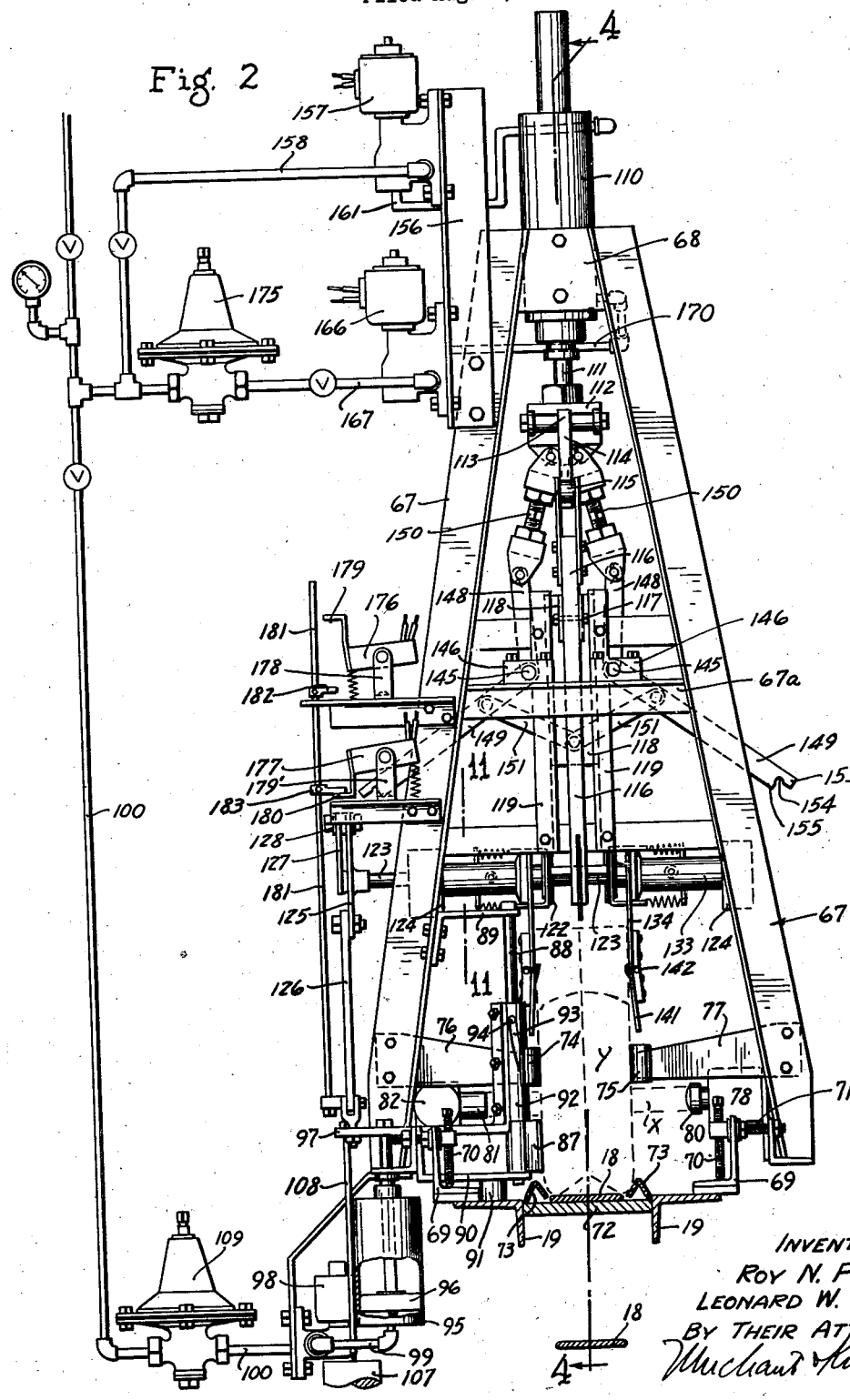

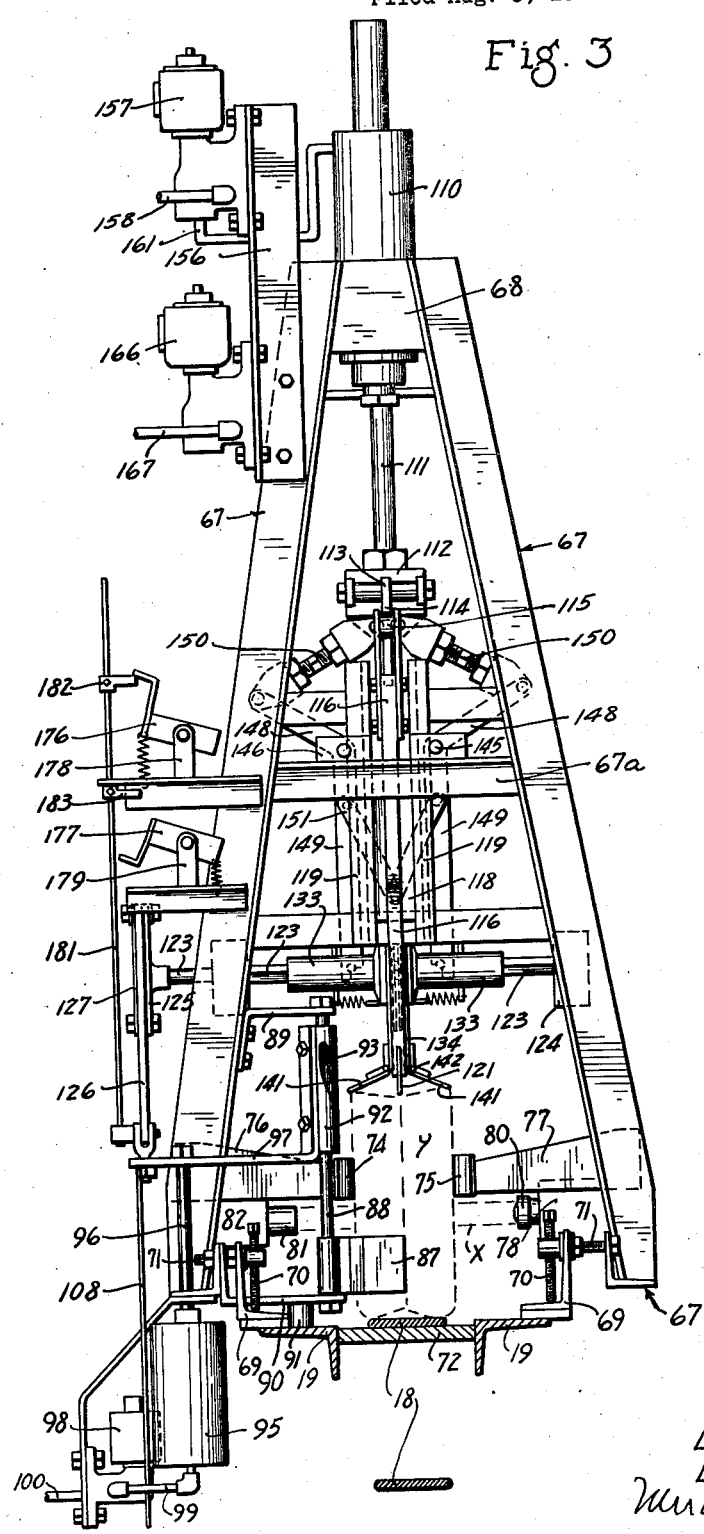

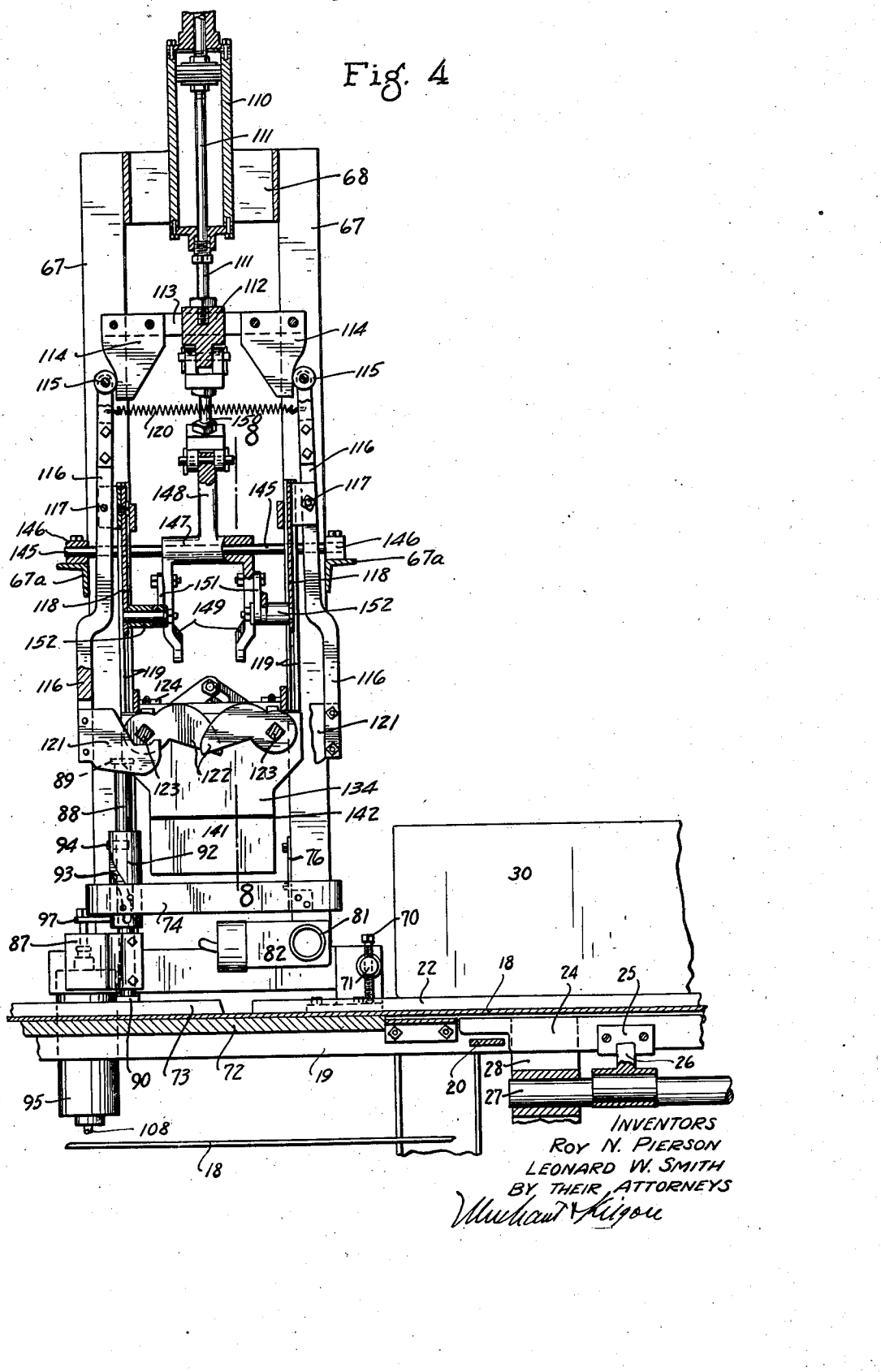

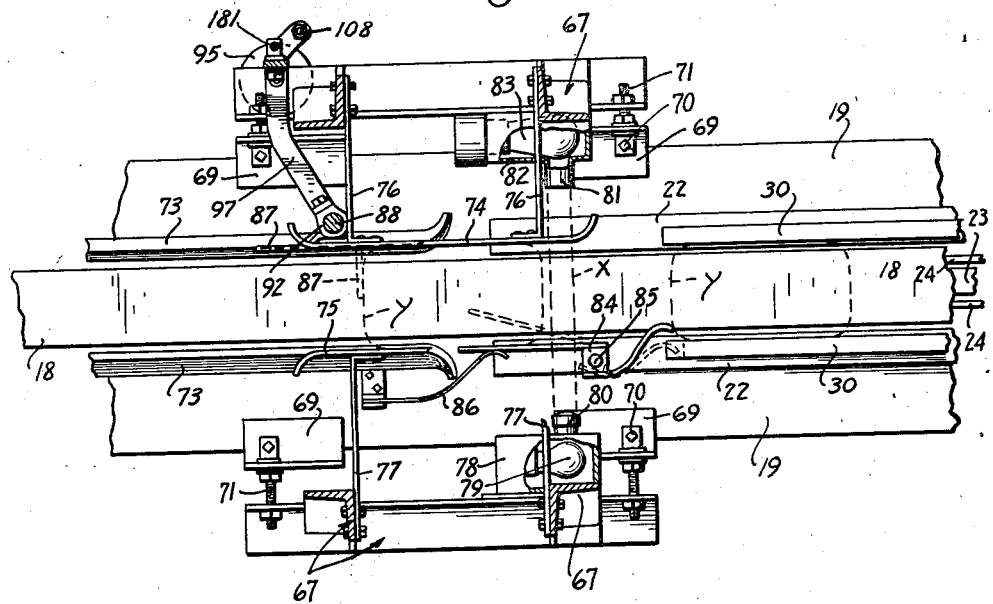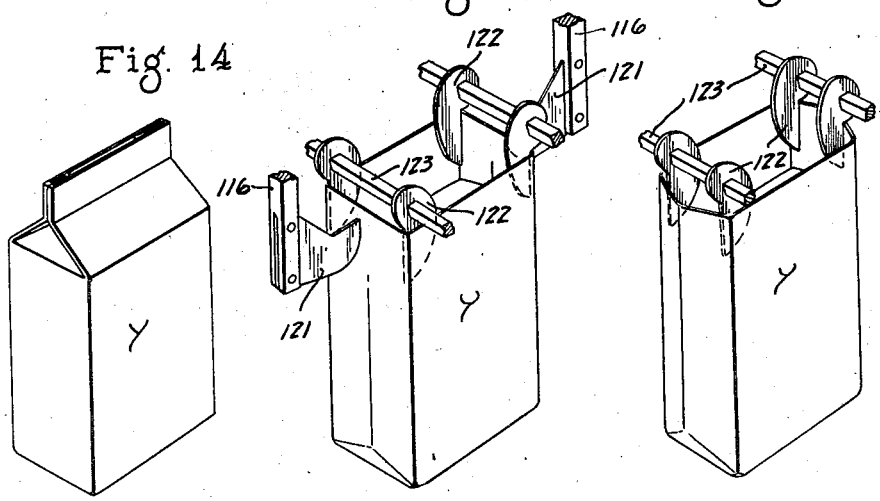

INVENTORS
ROY N. PIERSON
LEONARD W. SMITH
BY THEIR ATTORNEYS

INVENTORS
ROY N. PIERSON
LEONARD W. SMITH
BY THEIR ATTORNEYS

April 26, 1938.  R. N. PIERSON ET AL  2,115,176
BAG INTUCKING MACHINE
Filed Aug. 9, 1937   11 Sheets-Sheet 8

INVENTORS
ROY N. PIERSON
LEONARD W. SMITH
BY THEIR ATTORNEYS

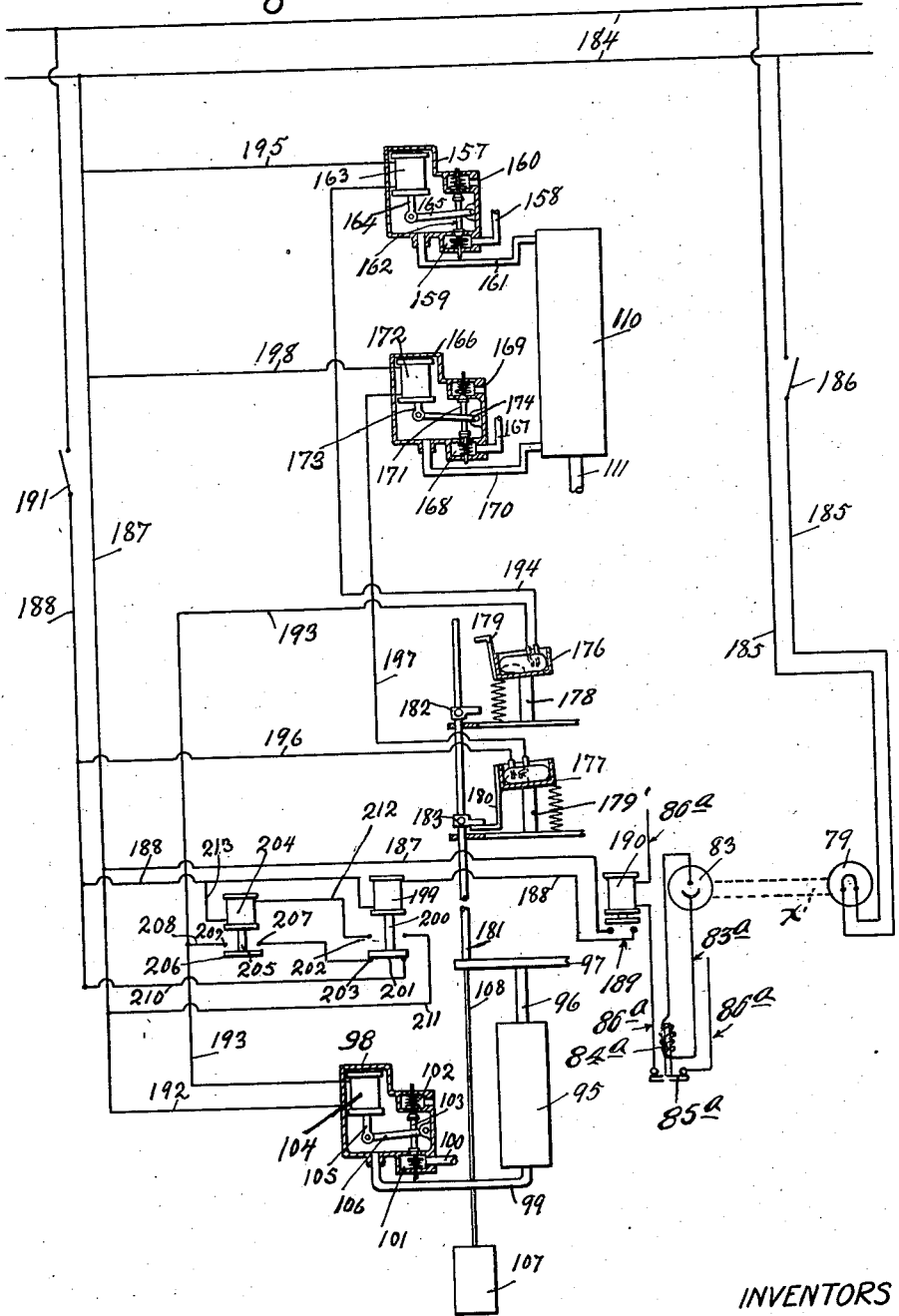

Patented Apr. 26, 1938

2,115,176

UNITED STATES PATENT OFFICE 2,115,176

BAG INTUCKING MACHINE

Roy N. Pierson and Leonard W. Smith, Minneapolis, Minn., assignors to Russell-Miller Milling Company, Minneapolis, Minn., a corporation of North Dakota Application August 9, 1937, Serial No. 158,080

34 Claims. (Cl. 93—6)

This invention provides an improved machine which, because of the nature of the work it performs, is herein designated as a bag intucking machine.

In United States Patent No. 1,998,287 of date April 16, 1935, issued to Roy N. Pierson (one of the joint inventors of the present application) and to Charles H. Carlson, as joint inventors, there is disclosed and claimed a "Bag sealing machine", the function of which machine was to fold and seal the tops or flaps of properly loaded sacks. The machine of the prior patent was designed to receive the properly filled or loaded sacks from the packer or other source and to carry the same to a point where, by a hand operation, the flanges of the sacks were "intucked" by an attendant and given such form that they could be received by the folding devices of the machine.

The present machine is designed to do the work of "intucking"; that is, the forming of the flaps of the sacks for proper delivery to the folding mechanism of the machine, thereby performing the work hitherto done by hand and eliminating the requirement of an attendant.

While the machine is particularly designed for use in connection with mechanism such as or similar to that of the prior patent above noted, it is not limited to that particular application, but is capable of general use for performing the function of intucking, wherever such automatic operation is required. As a highly important feature the invention employs a photo-electric cell as the controlling element of automatic mechanism for setting the intucking mechanism to action, when the sacks are properly positioned for intucking. This invention further involves certain other novel features, as will hereinafter more fully appear.

The machine, as well as that of the prior patent, is especially adapted for operation on paper sacks that are of the intucking type and which, when filled and sealed, are given what approximates rectangular form. The intucking mechanism will, however, operate on sacks that have open flaps of any well spread or open formation. Paper sacks containing flour varying, for example, from five to twenty-five pounds more or less, are usually made of quite stiff fibrous paper.

The machine also involves improved means for receiving the sacks, for shaking and packing down the flour therein and for delivering the sacks with their open upper ends well spread so that the forming and tucking devices may operate thereon to form the intucking actions.

Hitherto, in actual practice, this intucking of the sacks has not been successfully performed by automatic mechanism, but has, as above indicated, required manual operations, always difficult to perform at the proper time. The automatic mechanism for performing the intucking action of the present machine is timed both in respect to the feed mechanism for delivering the sacks to the intucking mechanism and to the folding and sealing mechanism, which complete the closing of the filled sacks.

A commercial form of the machine is illustrated in the accompanying drawings, wherein like characters indicate like parts throughout the several views.

Referring to the drawings:

Fig. 2 is a transverse section taken on the line 2—2 of Fig. 1;

Fig. 3 is a section taken on the same line as Fig. 2, but with the parts in different positions and with some parts removed;

Fig. 4 is a longitudinal section taken substantially on the line 4—4 of Fig. 2, some parts being shown in full;

Fig. 5 is a horizontal section taken on the line 5—5 of Fig. 1, some parts being removed;

Fig. 12 is a perspective showing a sack as it appears when presented to the intucking machine;

Fig. 13 illustrates the action of the intucking mechanism on the sack;

Fig. 14 shows the sack intucked and ready for presentation to the sealing mechanism of the machine;

Fig. 15 is a diagram illustrating the wiring and electrical devices of the machine;

Figure 1:
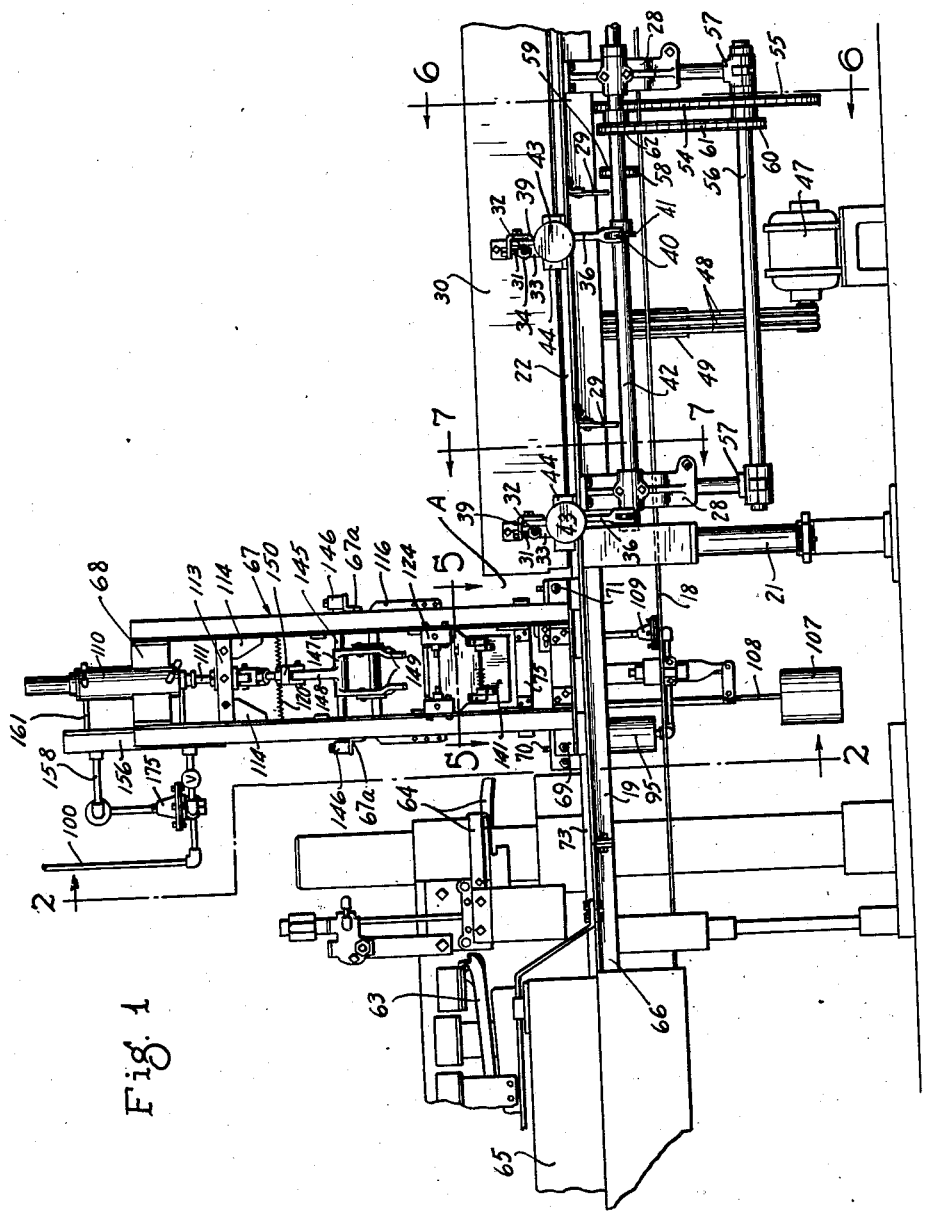
Fig. 1 is a side elevation showing the improved machine.

The drawings of this application illustrate a commercially operated machine in which the loaded bags are received from the packer and, by a vibrating or shaking conveyor, are delivered to the intucking mechanism and from the latter are delivered to the folding and sealing machine. The vibrating feeder is spaced from the receiving elements of the folding and sealing machine to form a gap, indicated at A in Fig. 1, and within which gap the intucking mechanism is located. In this commercial and preferred form of the machine the sacks are conveyed from the packer along the vibrating feed mechanism, are carried to and through the intucking mechanism, and from thence are carried to and through the folding and sealing mechanism or machine. This master feed belt, which is indicated by the numeral 18 is a continuously driven horizontally disposed belt that runs over suitable guide wheels, not shown, but one located near the receiving end of the vibrating conveyor and the other at the delivery end of the folding and sealing mechanism.

Vibrating feeder

This vibrating feeder includes a portion of the master feed belt 18 and comprises a framework made up of laterally spaced horizontal table-forming rails 19 which, as shown, are angle irons tied together by yokes 20 and supported by legs 21. Laterally spaced horizontally beveled skid rails 22 are mounted on the table rails 19 and are spaced so that the upper run of the feed belt 18 runs freely between the same.

Figure 6:
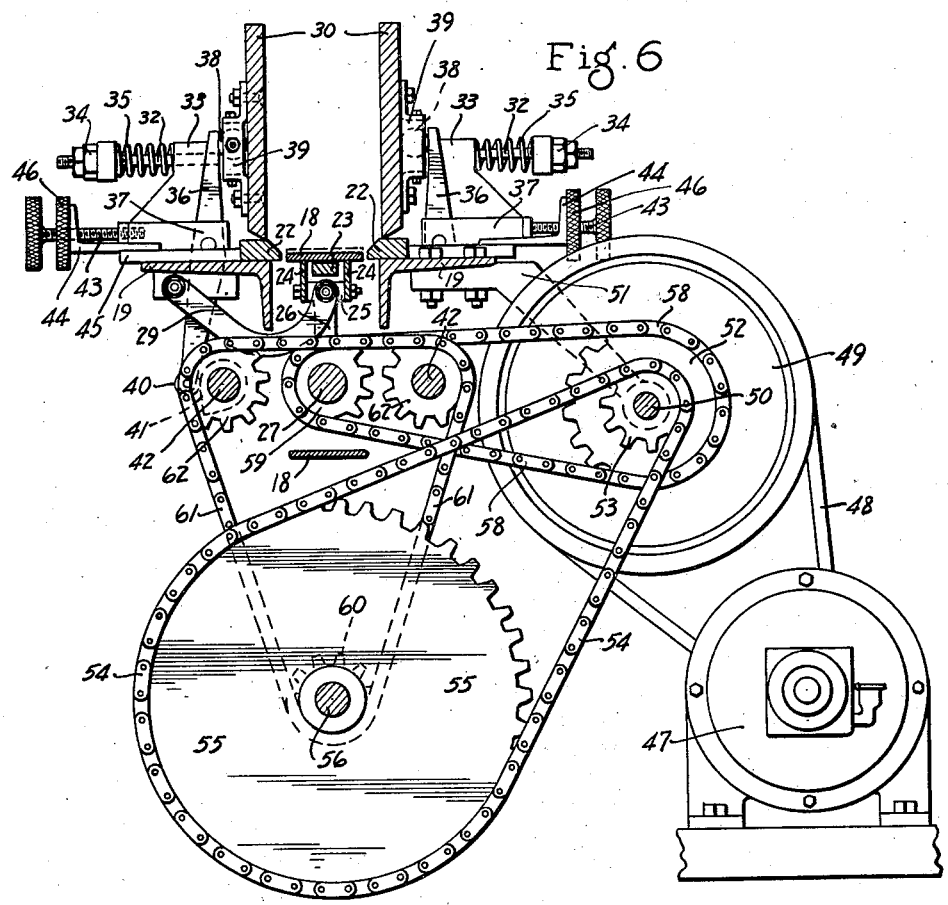
Fig. 6 is a section taken on the line 6—6 of Fig. 1.
Figure 7:
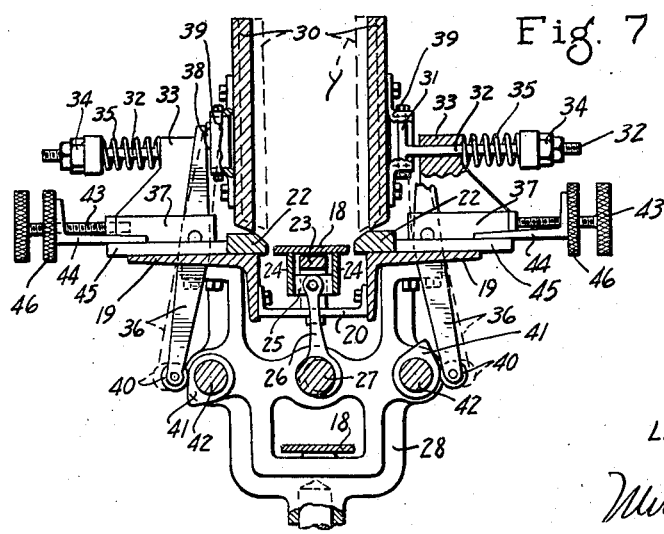
Fig. 7 is a transverse section taken on the line 7—7 of Fig. 1.

That portion of the upper run of the belt 18 in respect to Fig. 1 that is at the right of the gap A runs over a narrow table rail 23 that is rigidly supported on the tie brackets 20. A pair of laterally spaced shaker bars 24, see particularly Figs. 1, 6, and 7, work one on each side of the table rail 23 and are connected by tie blocks 25 pivotally connected to the upper ends of crank rods 26, which, in turn, work on eccentric portions of a shaft 27 journaled in brackets 28 hung from the table rails 19. To hold the shaker bars 24 in lateral positions their tie blocks 25 are connected to the inner ends of arms 29, the outer ends of which are pivotally hung from one of the table rails 19, best shown in Fig. 6.

As the loaded sacks are received from the packer they are carried by the belt 18 along the skid rails 22 and between laterally spaced vibratory packer boards 30. These packer boards 30 are hingedly connected at 31 to the inner ends of plungers 32 that work through bearing brackets 33, rigidly secured on the table rails 19. At their outer ends the plungers 32 are provided with nuts 34 between which and the brackets 33 compressed coil springs 35 are applied. The springs 35 tend to separate the vibratory packer boards 30 and to hold the same substantially as indicated by full lines in Fig. 7. Under the operation of the machine the packer boards 30 are given short lateral vibratory movements against the sides of the loaded sacks. This is accomplished through levers 36 which, as shown, are intermediately pivoted to bearings 37 slidably mounted on the table rails 19. At their upper ends these levers 36 work against bearings on the outer sides of the boards 30, such bearings being, as shown, afforded by wheels or rotary elements 38 mounted in bearing boxes 39, to which the pivotal connections at the inner ends of the plungers 32 are also connected. At their lower ends levers 36, as shown, are provided with rollers 40 that are subject to the action of small cams 41 carried by shafts 42 journalled in the brackets 28.

The bearings 37, as shown, are made adjustable by screws 43 that work through brackets 44 that are rigidly attached to blocks 45, rigidly secured to the table rails 19. The numerals 46 indicate lock nuts applied to the screws 43 and working against the brackets 44. The inner ends of the screws 43 are swivelled to the sliding blocks 37.

The various vibratory parts above noted, to wit: the packer plates or boards 30 and the shaker rails 24, receive their vibratory motion from an electric motor 47 through various driving connections that will now be traced. The rotor of the motor 47 drives a belt 48 that runs over a large pulley 49, secured on a shaft 50 journaled in brackets 51 secured to and depending from one of the table rails 19. This shaft 50 also carries two speed reducing sprockets 52 and 53. A sprocket chain 54 runs over the smaller sprocket 53 and over a relatively large sprocket 55 that is secured to a shaft 56 journaled in bearings 57 hung from the brackets 28.

A sprocket chain 58 runs over the sprocket 52 and over a sprocket 59 on the crank shaft 27. The shaft 56 is provided with a small sprocket 60. A sprocket chain 61 runs over the sprocket 60 and over sprockets 62 on the cam surface 42.

Under the action of the vibrating feed mechanism just described the loaded sacks will be carried by the master belt 18 between the packer boards 30, and the sacks will be constantly vibrated vertically by the motion imparted to the shaker rails 24 through the crank rod 26 under action of the crank shaft 27; at the same time, under the action of cams 41 and through the levers 46 and spring pressed plungers 32, the sides of the sacks will be constantly tapped by the boards 30. In this way the flour in the sacks will be well packed down into the sacks and the sides of the sacks will be flattened, giving the sacks what somewhat closely approximates rectangular form.

The vibrating feeder or feed mechanism illustrated in the drawings and above described is not herein claimed per se as the same is the sole invention of Roy N. Pierson, one of the joint inventors in the present application. However, vibrating feed mechanism combined with the continuously running master feed belt, which receives sacks from the packer and carries the same to the intucking mechanism and past the latter to folding and sealing mechanism is considered a feature of the present invention and is herein broadly claimed.

Folding and sealing mechanism

The folding and sealing mechanism, which may be well employed in connection with the present invention, is fully disclosed and claimed in the prior patent to Pierson and Carlson above identified, and, hence, only the receiving portions thereof are indicated and which parts may be briefly noted as follows: The spiral cam bars 63 are supported and operated as described in the prior patent. The intucked but unfolded flaps of the sacks are directed to these cam bars by diverging gathering arms 64, also more fully described in the prior patent. The sacks are delivered to the folding mechanism by the master belt 18 and are further conveyed by laterally spaced side belts 65 that are supported on the framework of the folding machine. Of the parts of the framework of this folding machine it may be noted that table rails 66 are connected to the delivery ends of the table rails 19 and that the latter are extended through the gap A.

In the statements just made it will, of course, be understood that the loaded sacks have been intucked by the intucking mechanism of the present invention before they are delivered between the gathering arms 64. The intucking mechanism, which constitutes the major part of the present invention, is located in the gap A and will now be described.

*Intucking mechanism*

This intucking mechanism, as already stated, is capable of various modifications and arrangements but, as shown in the commercial machine illustrated, embodies automatic intucking mechanism, the major elements of which are directly or indirectly supported from an upright frame, indicated as an entirety by the numeral 67 made up of two A-frames rigidly connected at their upper ends by a head block 68, and at their lower ends rigidly connected to the table rails or beams 19 by means of angle brackets 69, vertical screw rods 70 and horizontal screw rods 71. The brackets 69 are rigidly secured to the outstanding flanges of the rails 19; the screw rods 70 afford means for angular adjustments, and the screw rods 71 for lateral adjustment of the entire frame 67 in respect to the table rails or beams 19, see particularly Figs. 2 and 3. In the several views, see particularly Figs. 2, 3, 12, 13, and 14 the paper sacks are indicated by the characters y, said sacks in Figs. 2 and 3 being indicated only by dotted lines. The upper run of the feed belt 18, after it runs from the shaker devices, passes over a fixed table plate 72, see particularly Figs. 2, 3, and 4, that extends rearward and preferably past the folding and sealing mechanism. The sacks, as they are moved past the intucking mechanism, are aligned and centered by bevelled centering rails or flanges 73 that are fixed to or in respect to the table board or plate 72.

When the filled sacks are moved between and past the light beam, they are engaged by laterally spaced guide shoes 74 and 75 that are secured to the uprights of the frame 67, by strap-like arms or projections 76 and 77. Secured to one of the front uprights of the frame 67, see particularly Figs. 2 and 5, is a light-bulb housing 78, within which is a light bulb 79. Housing 78 has a light projecting tube 80 that directs light transversely across the path of movement of the sack in a beam, indicated by dotted lines marked $x$ on Fig. 5. This beam $x$ is delivered into the light receiving neck 81 of a small housing 82 that encloses a photo-electric cell 83. As will presently hereinafter appear, the automatic intucking mechanism will be set into action whenever a sack is in position to cut off or obstruct the light beam $x$.

When the sack is entered between the shoes 74 and 75 it will engage the rear end of a primary sack stop or intercepting device 84, see Fig. 5, that is intermediately pivoted at 85 to a suitable fixed support such as one of the table rails 19, and the curved front end of said stop device will then stand slightly in the path of movement of the oncoming sack and will stop the same, as shown by full lines in Fig. 5. When the sack has passed the rear end of the stop lever or device 84, the said stop device will be moved into a releasing position, shown by dotted lines, under the action of a light spring 86, shown as anchored to a projection from one of the centering rails 73.

When the sack has reached the position for intucking under the automatic mechanism, it will be positively stopped and held in that position by a secondary stop or intercepting device in the form of an arm 87, which will then stand, as indicated by dotted lines in Fig. 5. This stop arm 87 is secured to the lower end of a vertical shaft 88 journaled at its upper end in a bracket 89 secured to one of the uprights of the main frame, and at its lower end journaled in a bracket or bearing 90, which, as best shown in Figs. 2 and 3, is rigidly secured to one of the rails 19 by a block 91 or the like.

Mounted for vertical movements on the oscillatory shaft 88 is a cam-acting sleeve 92 that has a spiral cam groove 93 that engages a laterally projecting pin 94 on said oscillatory shaft. As will hereinafter appear, the stop arm or blade 87 will be oscillated with a properly timed action, under vertical movements of the cam sleeve 92.

Cam sleeve 92 is given vertical movements but held against oscillatory movements under the action of an automatically controlled power device. This power device, as shown, comprises a stationary cylinder 95, see particularly Figs. 2 and 3, in which works a piston 96, the rod of which is connected to a long armed bracket 97 that is secured to and projects from the cam sleeve 92. Cylinder 95 is supported in a fixed position by any suitable means such as a connection to one of the rails 19.

The motive fluid for operating the cylinder and piston motor 95—96 is assumed to be and preferably is compressed air. This air will be supplied to and discharged from the cylinder 95 under the action of valve mechanism, such as shown in Fig. 15, wherein the casing of such valve mechanism is indicated by the numeral 98. This casing is connected to the lower end of the cylinder 95 through an air pipe 99. Compressed air is supplied to the casing 98 by an air pipe 100 that leads from a suitable source of supply and taps a lower admission port 101 of said valve casing. Valve casing 98 is further provided with a discharge port 102 that opens to the atmosphere. The interior of the casing 98 is arranged to be alternately opened to a supply of air from port 101 and for discharge of air through port 102 under the action of a double-ended plunger valve 103 that is arranged to be reciprocated under the action of a magnetic coil or solenoid 104 and co-operating plunger 105, which latter, as shown, is connected to the valve 103 by a lever 106. In the particular arrangement illustrated downward movement of piston 96, when valve casing 98 is open to atmosphere, is hastened and insured by the action of a weight 107 connected by a suspending rod or cable 108, see particularly Figs. 2 and 15, to the arm of bracket 97, to which, it will be remembered, the rod of piston 96 is directly connected.

In the drawings the numeral 109, see particularly Fig. 2, indicates a pressure reducing valve interposed in the air pipe 100 that leads to the casing 98, and hence to the cylinder 95. From what has been said it will be understood that when air is introduced into the cylinder 95, piston 96 and cam sleeve 92 will be raised, thereby causing the stop blade or arm 87 to be moved from its retracted position to a position transversely of the line of feed of the bags; and, conversely, when the piston is lowered blade or arm 87 will be automatically swung back to its retracted position parallel to the line of feed of the sacks and at one side of the line of feed. As will hereinafter appear, these movements are automatically performed with properly timed actions.

Located in a vertical position at the vertical axis of the frame 67 is a cylinder 110 which, as shown, is extended through and rigidly secured in the head 68. Working in the cylinder 110 with its stem depending therefrom is a piston 111, see Figs. 2 and 4, the lower end of which is connected to a coupling head 112 that carries a cam head afforded by a transverse bar 113 and cam plates 114.

The curved outer edges of the cam plates 114 operate on the roller-equipped ends 115 of a pair of intucking levers 116 that are intermediately pivoted at 117 to cross-head plates 118 that are slidably mounted for vertical movements in guideways 119, as shown, formed by channel bars rigidly secured to cross members of the main frame 67. The upper ends of levers 116, as shown, are cross connected by a coil spring 120 that yieldingly holds the rollers 115 against the cam edges of the plates 114.

Figure 8:
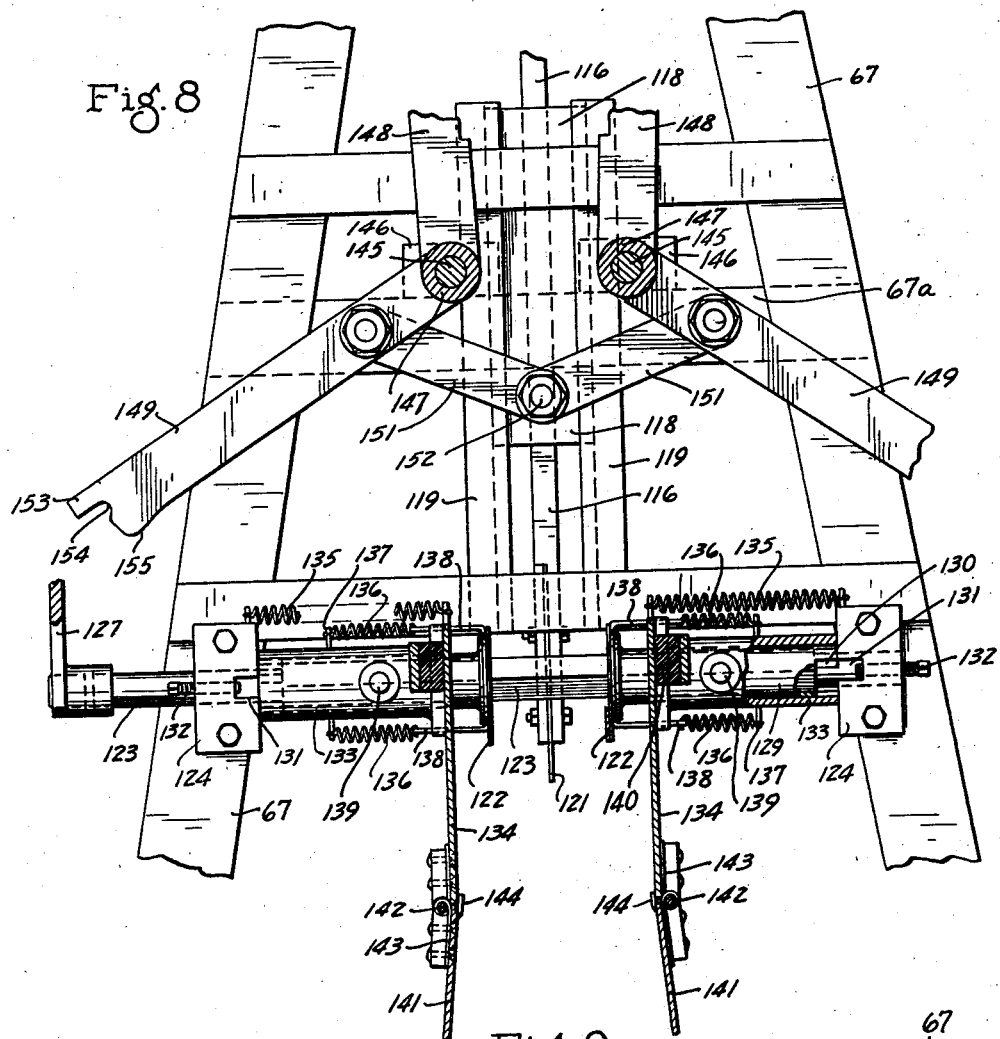
Fig. 8 is a section taken on the line 8—8 of Fig. 4.
Figure 9:
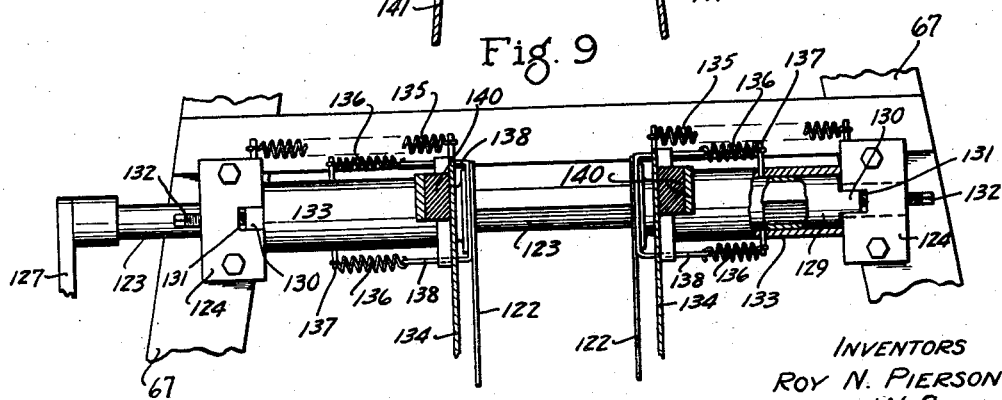
Fig. 9 is a view corresponding to Fig. 8 but illustrating different positions of the parts and with many of the parts removed.

At their lower ends the levers 116 are provided with inwardly projecting blade-like intucking plates or fingers 121, see particularly Fig. 4. These plates 121 constitute the two outside intucking fingers, and which engage with the exterior of the sack. To hold a neck of the sack properly spread for intucking there is provided two pair, that is, four so-called inside spreading fingers. These spreading fingers, as shown, are preferably in the form of blades 122, see particularly Figs. 4, 8, 9, 12, and 13, that are mounted in pairs on the rectangular portions of two parallel transversely extended rock shafts 123, the round end portions of which are journaled in bearings 124 secured to the main frame, as best shown in Figs. 8 and 9. One of the shafts 123 at one end is provided with a projecting arm 125 that is connected by a link 126, see Fig. 2, to the bracket 97 that carries the cam sleeve 92 and is subject to movement of piston 96. The two shafts 123 are connected for simultaneous oscillatory movements in reverse directions by a pair of arms 127, see particularly Fig. 11, secured one to each of said rock shafts and at their lapping end having a slot pin coupling indicated at 128.

The inside tucking fingers or blades 122 are, in the structure illustrated, directly secured to the ends of sleeves 129 that are slidable on the angular portions of the shafts 123 and at their outer ends are provided with lugs 130 that normally engage the inner faces of the bearing blocks 124 but are adapted to be turned into engagement with notches 131 formed in said blocks, and at the bottoms of which notches stop screws 132 are shown as applied through said blocks, as best shown in Figs. 8 and 9.

Mounted on the inner sleeves 129 are outer sleeves 133, to the inner ends of which are secured clamping plates 134. These opposed clamping plates 134 are each secured to the ends of the two sleeves 133 that are on the same side of the bag-feeding channel and, hence, the said clamping plates 134 are held in vertical positions capable of sliding movements toward and from each other but are held against oscillatory or other movements in their own vertical planes.

Coil springs 135 attached to the clamping plates 134 and to the adjacent blocks 124 tend to keep the clamping plates 134 separated, as shown in Figs. 8 and 9. In the drawings, coil springs 136 yieldingly connect the fingers or blades 122 to the corresponding outer sleeves 133. As shown, these springs 136 are attached to pins 137 projected from the outer sleeves 133 and to yoke-like straps 138 that are connected to the outer ends of the inner sleeves 129 and, hence, to the corresponding fingers 122. The outer sleeves 133 are provided on their front and rear sides with projecting lugs or studs 139. Adjacent to the lugs 139 the clamping plates 134 are shown as provided with cushioned bearing blocks or surfaces 140. These bearing lugs 140, as shown, consist of rubber blocks having outer metallic faces.

Bag folding leaves 141, preferably in the form of flat metal plates, are hingedly connected to the lower edges of the clamping plates 134 at 142. Hinge springs 143 tend to hold the leaves 141 nearly in the planes of the plates 134, or as shown in Fig. 8, but adapted to be turned to positions shown in Fig. 10. One of the leaves 141 at its hinge joint is provided with a projecting or bag creasing flange 144, as best shown in Figs. 2, 8, and 10, which is located at that side toward which the neck of the sack will be folded for sealing if it has been intucked and creased, ready for such folding action.

Extended transversely of the main frame about midway up is a pair of parallel shafts 145, the ends of which are shown as secured on blocks 146 secured to transverse braces 67a of the main frame. Mounted on each of these shafts 144 is a sleeve-like hub 147, each of which has an upwardly projecting arm 148 and two depending spaced arms 149, see particularly Figs. 2 and 4. The upwardly extended arms 148 are connected to the vertically movable head 112 by links 150, which, as shown, are of the longitudinally adjustable type. The connected elements 148 and 150, see particularly Figs. 2 and 3, constitute toggle-acting connections between the head 112 and the arms 149. It should now be noted that arms 149 are connected by links 151 to bosses 152 on the cross heads or sliding plates 118, see Fig. 4, but also note Fig. 8.

Figure 10:
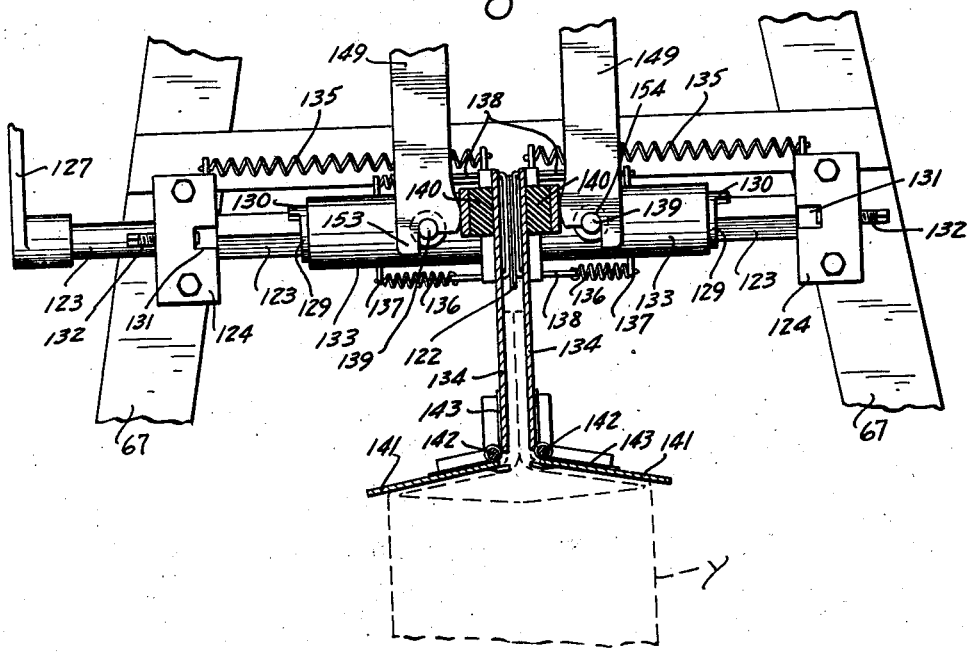
Fig. 10 is a view corresponding to Fig. 8, but showing different positions of the parts and illustrating their action on the sack.

The free ends of the clamping arms 149 are engageable with the studs or projecting lugs 139 on the sliding but non-rotary outer sleeves 133 and for such engagement are provided or formed with projecting finger portions 153, with notches 154 and with bearing surfaces 155, see particularly Figs. 8 and 10, which latter engage the metal faces of the cushioning blocks 140 of the clamping plates 134 with a peculiar action that will be noted in the description of the operation.

Timed valve mechanism is provided for controlling the admission and exhaust of air from the master cylinder 110 and, hence, the reciprocating movement of the piston 111. This valve mechanism shown comprises two valve structures, which, in the drawings, are applied to and supported from a bracket-forming bar 156 secured to the upper portion of the framework 67, see particularly Figs. 2 and 3 and the diagrammatic view Fig. 15. The casing 157 of the upper controlling valve receives air under pressure through an air pipe 158, that leads from the main air supply pipe 100 to the intake port 159. The casing 157 is also provided with a discharge port 160. Casing 157 is connected to the top of cylinder 110 by a pipe 161. Ports 159 and 160 are adapted to be alternately opened and closed by a double-ended plunger valve 162 that is arranged to be reciprocated under the action of a magnetic coil or solenoid 163 and co-operating plunger 164, which latter, as shown, is connected to said plunger valve by a pivoted lever 165. The interior of the casing 166 of the lower controlling valve is connected to the air supply pipe 100 by a pipe 167 that leads to the intake port 168 of said casing. Casing 166 is further provided with an exhaust port 169. The interior of the casing 166 is connected to the lower portion of cylinder 110 by pipe 170. The ports 168 and 169 are adapted to be alternately opened and closed by a double-ended plunger valve 171 that is adapted to be reciprocated under the action of an electro-magnetic coil or solenoid 172 and co-operating plunger 173, which latter operates on said valve through a pivoted lever 174. In Fig. 2 the numeral 175 indicates a pressure reducing valve interposed in the pipe 167.

For controlling the current to the electro-magnet 163 of the upper controlling valve mechanism there is provided a switch, preferably of the mercury bulb type, indicated by the numeral 176; and for controlling the current to the electro-magnet of the lower controlling valve mechanism there is provided a switch, also preferably of the mercury bulb type, indicated by the numeral 177, see particularly Figs. 2, 3, and 15. As shown, these mercury switches are pivoted to brackets 178 and 179' applied to the main frame 67, and said bulbs are shown as provided with projections in the form of angular fingers 179 and 180, respectively. The lower bulb 177 is under spring tension to assume a circuit breaking position, while the upper bulb 176 is under spring tension to move into circuit closing position.

These mercury switches are arranged to be automatically actuated with properly timed actions by connections which, as shown, include a vertically movable rod 181, the lower end of which is movable with the bracket 97, which, it will be remembered, is moved with the cam-acting sleeve 92 under the action of the piston 96 of the lower motor or reciprocating cylinder and piston device. The switch actuating rod 181 is provided with taps 182 and 183 that act, respectively, on the fingers or projections 179 and 180 of the bulbs 176 and 177.

As shown by the diagrammatic view Fig. 15, the current to be supplied to the various electrically actuated parts of the apparatus is supplied from main lead or supply wires 184. The bulb 79, which affords the light source of the automatic control is connected across the main leads 184 and branch circuit 185, in which is a manually operated switch 186.

The photo-electric cell 83, which is of a well-known construction and operation, is connected by a circuit 83a to a switch-acting solenoid 84a that acts upon the armature-equipped contact 85a to close an A. C. circuit 86a that includes the solenoid or magnet 190. When magnet 190 is energized, it raises and holds in a circuit breaking position the armature-acting contact 189, which latter, when lowered, closes the circuit through wires 187 and 188. One of said leads, to wit: as shown in the lead 188, is a manually operated switch 191. A wire 192 tapped off from the lead 187 is connected to one terminal of the switch actuating magnet or solenoid 104, and from the other terminal of said magnet 104 a wire 193 is extended to one of the electrodes of the mercury switch 176. From the other electrode of said switch 176 a wire 194 is extended to one terminal of the switch actuating magnet 163; and from the other terminal of said magnet 163 a wire 195 is extended to and taps the lead 187.

One electrode of the mercury switch 177 is connected to the lead 188 by a wire 196; from the other electrode of said switch 177 a wire 197 is extended to one terminal of the switch-actuating magnet 172; and the other terminal of said magnet 172 is connected to the lead 187 by a wire 198.

Interposed in the lead wire 188 is a switch-actuating magnet or solenoid 199 that operates a plunger 200, that carries a switch contact 201. Contact 201 co-operates with spaced upper and lower pairs of contacts 202 and 203. The numeral 204 indicates a co-operating switch-actuating magnet or solenoid that operates on a plunger 205 that carries a switch contact 206, that is engageable with spaced switch contacts 207. One of the contacts 207 is connected to the wire 193 by a wire 208; the other contact 207 is directly wired to the left hand contacts 203; and the other contact 203 is connected to the lead 188 by a wire 210. One of the switch contacts 202 is connected to the lead 187 by a wire 211, and the other contact 202 is connected to one terminal of switch-actuating magnet 204 by a wire 212. The other terminal of magnet 204 is connected to lead 188 by a wire 213.

*Operation*

Before summarizing the operation of the complete machine, it is thought best to first describe the function and operation of certain of the groups of mechanism involved in the machine.

The normal or idle position of the various parts of the machine are best shown in Figs. 2, 4, 8, and 9. The manner in which the bags will be conveyed to the intucking mechanism by the feed blade 18 and acted upon by the co-operating shaking devices has already been clearly stated.

The intucking devices are operated by the cylinder and piston motor 110—111. Normally, the presser plates 134 will be separated, the inside fingers 122 will be moved to their most closely adjacent position, and the outside intucking fingers or blades 121 will be retracted. At such time also the inside tucking fingers 122 will be rotatively raised to position shown in Fig. 4 and the presser arms 149 will be spread or separated, as best shown in Fig. 8.

When by the introduction of compressed air into the upper end of cylinder 110 piston 111 will be forced downward and the following operations will follow therefrom, to wit: The head 112, cross-head bar 113, and cam plates 114 will be directly forced downward by the downward movement of said piston 111. Downward movement of said head 112 acting through the toggle-acting connections 148–150 will, for the early part of the downward movement of the piston, cause the sliding plates 118, together with levers 116, to move downward at about the same rate of speed as the bar 113 and cam plates 114. However, during the latter part of the downward movement of the piston 111, and at a time after the tucking fingers or blades 121 have been lowered approximately to their proper position for intucking action, the cam plates 114 will be given downward movement faster than the slides 118 and levers 116 so that said cams acting on the rollers 115 will force the intucking fingers or blades 121 inward or toward each other in a vertical plane between the inside fingers 122, which latter at that time will have been turned downward, as shown in Fig. 13, but are then separated to the maximum extent as will presently appear.

Under the final or latter part of the downward movement of piston 111, the fingers or projections 153 of clamping arms 149 will engage the stud-like projections 139 of the outer sleeves 133 which carry the clamping plates 134 and will force the said clamping plates to closed positions on the flaps of the sack substantially as shown in Fig. 10, by reference to which it will be noted that at such time the rounded surfaces of the levers 149 press against the cushioning lugs 140 of the said plates. Under such closing movements of the plates 134, the leaves 141 will engage the top of the sack, as shown in Fig. 10, thereby pressing the sack into substantially the form shown in Fig. 14, at the time when the outside intucking fingers 121 are pressed inward so as to bulge in the sides of the sack.

Here it should be again noted that the clamping plates 134 and inside tucking fingers 122 are under tension to separate and assume their normal positions, under the action of the springs 135 and 136. Under upward movement of the piston 111, the levers 149 will be spread or separated and under that action the projecting ends 153 of said levers 149 will hold sleeves 133 and parts carried thereby against instantaneous spreading movement of the parts under the action of the springs 135 and 136.

When the sleeves 133, together with the inner sleeves 129, almost quite closely reach the limit of their outward or spreading movement, lugs 130 on sleeves 129 will be out of registration with the notches 131 of bearings 124 so that when said levers are released by the levers 129 and released to the action of springs 135 and 136, lugs 130 will strike the inner faces of said bearings and be held in the relatively closely spaced position shown in Fig. 12, and hence, readily insertable into the open mouth of the sack. Of course, the retracting movements of the levers 116 with fingers 121 and the arms 149 will take place under return or upward movements of the piston 111. The valves and other mechanism for controlling the upward and downward movements of the piston 111 will be described later on.

Normally, and as already stated, the inside fingers 122 will be not only spaced, as shown in Fig. 13, but will be pivotally raised, as best shown in Fig. 4.

Under upward movement of the piston 96 of cylinder 95, two important operations take place, to wit: In the first place, as the sack passes through and beyond the light beam, light is focused on photo-electric tube restoring relays to starting position. As time limit relay is now closed the circuit is closed through 209 and 207, allowing current to pass to coil 104 opening air valve allowing air to pass into cylinder 95.

This starts the mechanism of the machine into action. The cam 93 of sleeve 92, acting on pin 94 of shaft 88, under upward movement of said sleeve, turns the stop blade 87 into the path of movement of the sack and stops the sack that is to be intucked.

Figure 11:
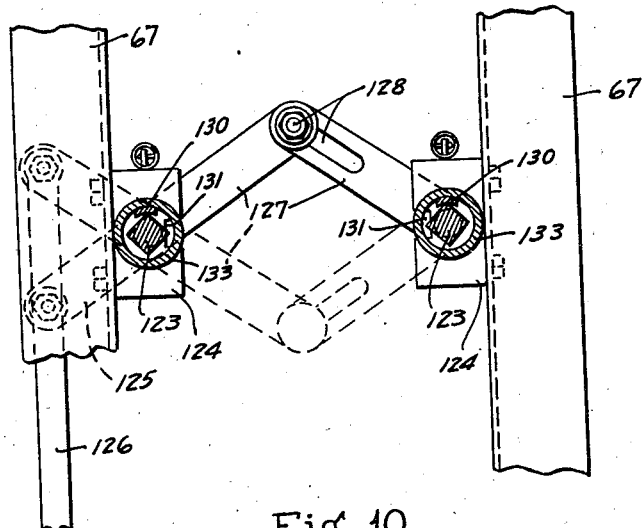
Fig. 11 is a fragmentary view with parts broken away, showing certain parts sectioned on the line 11—11 of Fig. 2.

In the second place, the upward movement imparted to bracket 97 that carries sleeve 92, operating through link 126, see particularly Fig. 2, and through arm 125, see particularly Fig. 11, rotates the shaft 123 and the two sleeves 129, thereby turning the inside tucking fingers or blades 122 from positions shown in Fig. 4 into downturned positions shown in Fig. 12, and immediately following this latter noted action brings the legs 130 into registration with the notches 131, permitting springs 135 and 136 to spread said fingers 122 within the open mouth of the sack, as shown in Fig. 13. Here it may be stated that approximately simultaneously with this latter noted spreading action of the fingers 122 the outside intucking fingers or blades 121 are pressed inward under the action previously described so as to intuck the front and rear sides of the sack; and immediately following this action that the clamping plates 134 are pressed together, as shown in Fig. 10, by an operation also just above described.

Under downward movement of piston 93, the operations performed by the upward movement of the said piston 96 will be reversed. Attention is here again called to the fact that when one of the sacks y is stopped in the position for intucking, as just stated, the upper run of the feed belt 18 will simply slip under the sack and the movement of said feed belt will not be intercepted.

At this point is should also be noted that when a sack is stopped by the blade 87, as above stated, it engages the inner arm of stop lever 84 pressing the same against spring 86 and throwing the rear end of said stop lever into a position shown by full lines in Fig. 5, thereby holding back the next following sack while the properly located sack is being intucked. When there is no sack in position for intucking, spring 86 will hold stop lever 84 in the dotted line position shown in Fig. 5 so that a sack will freely pass the rear end thereof and into engagement with the front end thereof, thereby always permitting a sack to be delivered by the feed belt to the proper position for intucking which, as stated, is in position to cut off the light beam x.

The upward and downward movements of the piston 111 of cylinder 110 is controlled by valve mechanisms located within the valve casings 157 and 166, see particularly Figs. 2, 3, and 15. In the position of the valve devices shown in Fig. 15, the valve 171 is raised so that the compressed air will flow into the casing 166 and from thence through pipe 170 into the lower end of cylinder 110; and at that time the air from the upper end of cylinder 110 finds an escape through pipe 161 into casing 157 and from thence out through exhaust port 160. This causes the piston 11 to be raised, as shown in Fig. 2. Under the conditions just stated, it must, for the time being, be assumed that magnet 172 is then energized and that magnet 163 at that time is deenergized; and that when magnet 163 is energized and magnet 172 deenergized, the action above stated will be reversed, that is, air will be admitted into the upper end of cylinder 110 and air will be exhausted from the lower end of said cylinder, thereby causing piston 111 to be lowered.

Under the conditions illustrated in Fig. 15, valve 103 in casing 98 is lowered so that air from the cylinder 95 will escape through pipe 99 into casing 98 and out through exhaust port 60 or passage 102, at a time when the supply of compressed air to the lower end of said cylinder is cut off by the lower end of said valve 103. This condition is effected when magnet 104 is deenergized. When magnet 104 is energized, valve 103 will be raised, thereby closing exhaust port 102 and opening a supply of air from pipe 100 into the interior of casing 98 and from thence through pipe 99 into the lower end of cylinder 95, thereby causing piston 96 and parts carried thereby to be raised performing the functions above described, and another important function which will now be described and which is performed by vertical movements of rod 181 and the tappets 182 and 183, which tappets operate, respectively on the mercury switches 176 and 177.

The diagram view Fig. 15 illustrates the normal condition of the intucking mechanism. It may, however, be assumed that the switches 186 and 191 are both closed so that the beam $x$ will be projected from the light source 79; and that alternating current is being supplied to the photo-electric cell 83. The current supplied to the light source 79 and to the various electromagnets should be D. C., although the supply to the light source 79 might also be an A. C. current. Also, it may be assumed that the feed belt 18 is being constantly driven. As already stated, the tucking mechanism is automatically started into action whenever the light beam $x$ is cut off from the photo-electric cell.

When the beam $x$ is active on the photo-electric cell magnet 84a will be energized closing the cell magnet 84a will be energized closing the switch 85a. Closing of switch 85a causes magnet 190 to be energized thereby opening switch 189 which causes magnet 199 to be deenergized closing switch 201—203, but as there is no current through magnet 204, switch 205 will remain open. At this time the circuit through mercury switch 176 is open but the circuit through switch 177 is closed which causes magnet 172 to be energized, thereby holding valve 171 in the raised position already described, but leaving magnet 163 deenergized so that switch 162 will be in its lowered position to cut off the supply of air from pipe 158 to the interior of valve casing 157. When these conditions prevail, the various parts of the intucking mechanism will be held in their normal positions, best indicated in Figs. 2, 4, 8, and 9.

When the light beam $x$ is cut off by a sack on its way to position for intucking, the photo-electric cell 83 will not generate current so that the magnet coil or solenoid 84a will be deenergized permitting switch armature 85a to drop, thereby causing magnet 190 to be deenergized. When magnet 190 is deenergized, its armature contact 189 will close the circuit between leads 187 and 188 thereby energizing magnet 199 lifting armature contact 201 and closing the circuit at 202, thereby energizing magnet 204 and causing the same to lift armature contact 205 and close the circuit between lead 207. Here it is important to note that the magnet 204 is a time-delayed relay magnet which, when energized, will remain energized for a certain period of time, say approximately two seconds, and which time will be sufficient for the complete operation of the intucking mechanism.

Immediately when the sack $y$ passes beyond the beam $x$ photo-electric cell will again be energized by the beam and will restore the switch 85a to the closed position causing magnet 190 to be energized and opening switch 189. This allows the switch armature 102 to immediately drop back into engagement with its relatively fixed contacts and breaking the circuit through magnet 204 which magnet, however, as above stated, remains energized for the stated sufficient time to hold switch 205 closed. During this short interval while switch armature 201 is dropped and switch armature 205 is held upward by the magnet 204, the circuit through magnet 104 is energized causing valve 103 to be raised and which valve movement admits air into the lower end of cylinder 95 and opens the upper end of said cylinder to exhaust. When this action takes place, piston 96, with the parts carried thereby, will be instantly raised and lifting the rod 181 with the tappets 182 and 183. It is during this short interval of time that the sack moves out of the beam $x$ to the dotted line position of Fig. 5 that the stop arm 87 is moved into the dotted line position of said view, to stop the sack in intucking position, in a manner already more fully described.

The upward movement of rod 181 causes tappet 183 to permit mercury switch 177 to move into a circuit opening position and tappet 182 engages arm 179 and rocks the mercury switch 186 into circuit closing position. Movement of switch 187 into circuit breaking position causes magnet 172 to be deenergized permitting valve 171 to drop; and rocking of mercury switch 176 into circuit closing position causes magnet 163 to be deenergized thereby causing valve 162 to be raised. As already more fully described, when this valve movement takes place, piston 111 of cylinder 110 will be quickly lowered thereby operating the bag intucking fingers or blades in a manner already fully described.

Assuming now that the intucking operation has been completed, the magnet 204 will lose its energy, thereby permitting armature contact 205 to drop causing the parts to re-assume the positions indicated in the diagram view Fig. 15, at which time piston 96 will be forced back to its lowered position and piston 111 will be raised or moved back to its normal raised position.

From the foregoing it is evident that the intucking or sack closing actions take place during a very short interval of time, to wit: during the time the sack passes out of the beam $x$ and before the sack, under continuous movement of the feed belt, is carried too far forward to be stopped in the proper intucking position by upward movement of the piston 96 which, as one of its functions, swings the stop blade or arm 87 into sack stopping position. In fact, all of the intucking movements and return movements of the mechanism take place very quickly so that there is only a very slight holding of the sacks against travelling movement with the feed blade, and hence, only a slight delay in the movement of the sacks to the folding and sealing mechanism to which the sacks are delivered by the feed belt as soon as the sacks are released for movement with the feed belt. There is no starting and stopping of the feed belt other than that required to start the machine into action and to stop the operation thereof.

The various magnetically operated switches perform independent and important functions. The current generated in the photo-electric cell 83 by the light beam $x$ is, of course, very slight, and hence, the switch of magnet 84a which is normally closed and serves as a primary tripping switch, is used only to supply current to the magnet 190 of the normally open secondary tripping switch of magnet 190 and which latter switch controls the circuit from leads 187 and 188 that are arranged to carry stronger current such, for example, as 110 volt current.

The switches of magnets 199 and 204 are arranged in an important co-operative relation but each performs a different function. The switch of magnet 199 is a quick action two-way switch and controls two circuits, one of which includes the magnet 204 and the other of which includes the switch elements of the said magnet. The said switch magnet 204 is quick acting when energized but is of very well-known character which retains its magnetism for a period of time such as stated so that the closing of said delayed switch is quick but the opening is slow. For reasons above stated, the switch of magnet 84a may be designated as a normally closed primary tripping switch; the switch of magnet 190 as a normally open secondary tripping switch; the switch of magnet 199 as a quick action two-way switch; and the switch of magnet 204 as a time-delayed release one-way switch.

Figure 16:
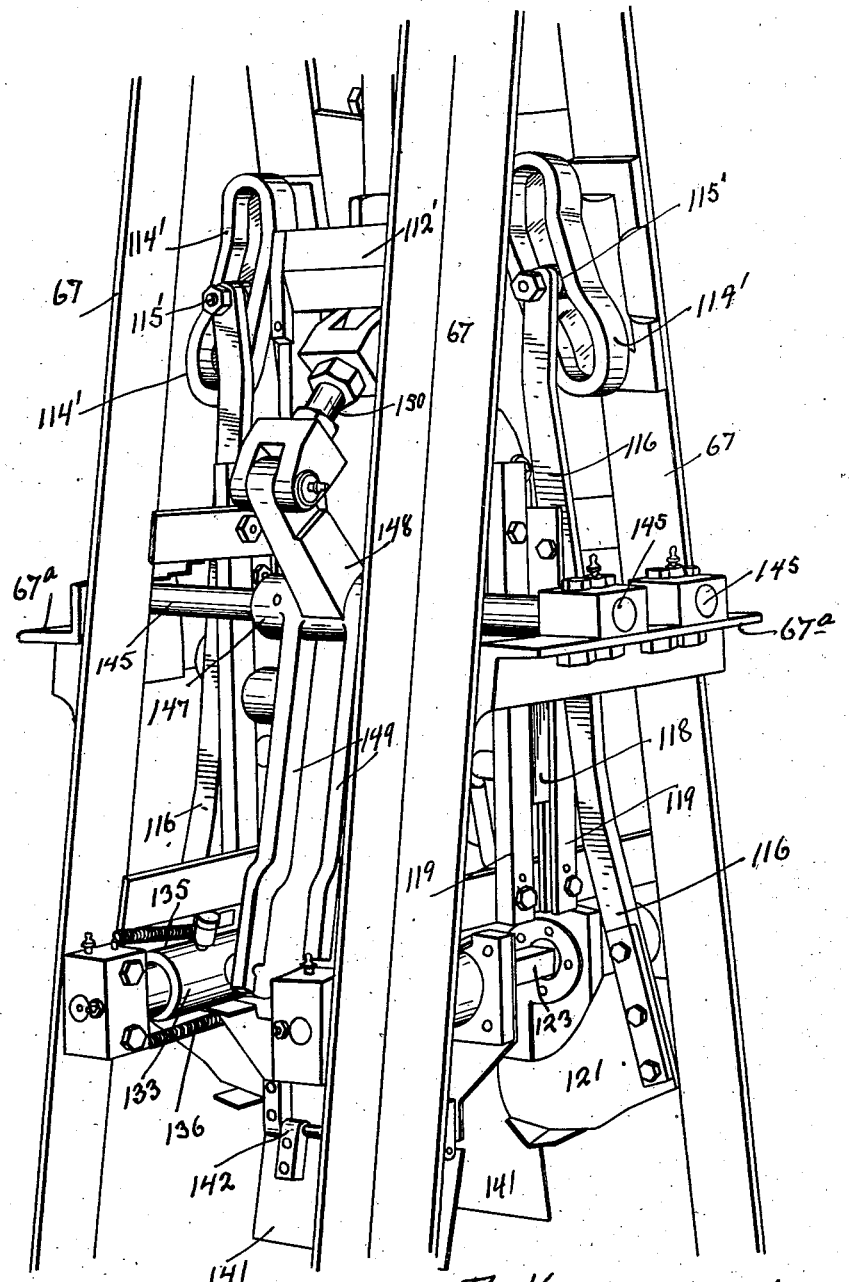
Fig. 16 is a perspective illustrating a modified or alterate form of the intake mechanism.
Figure 17:
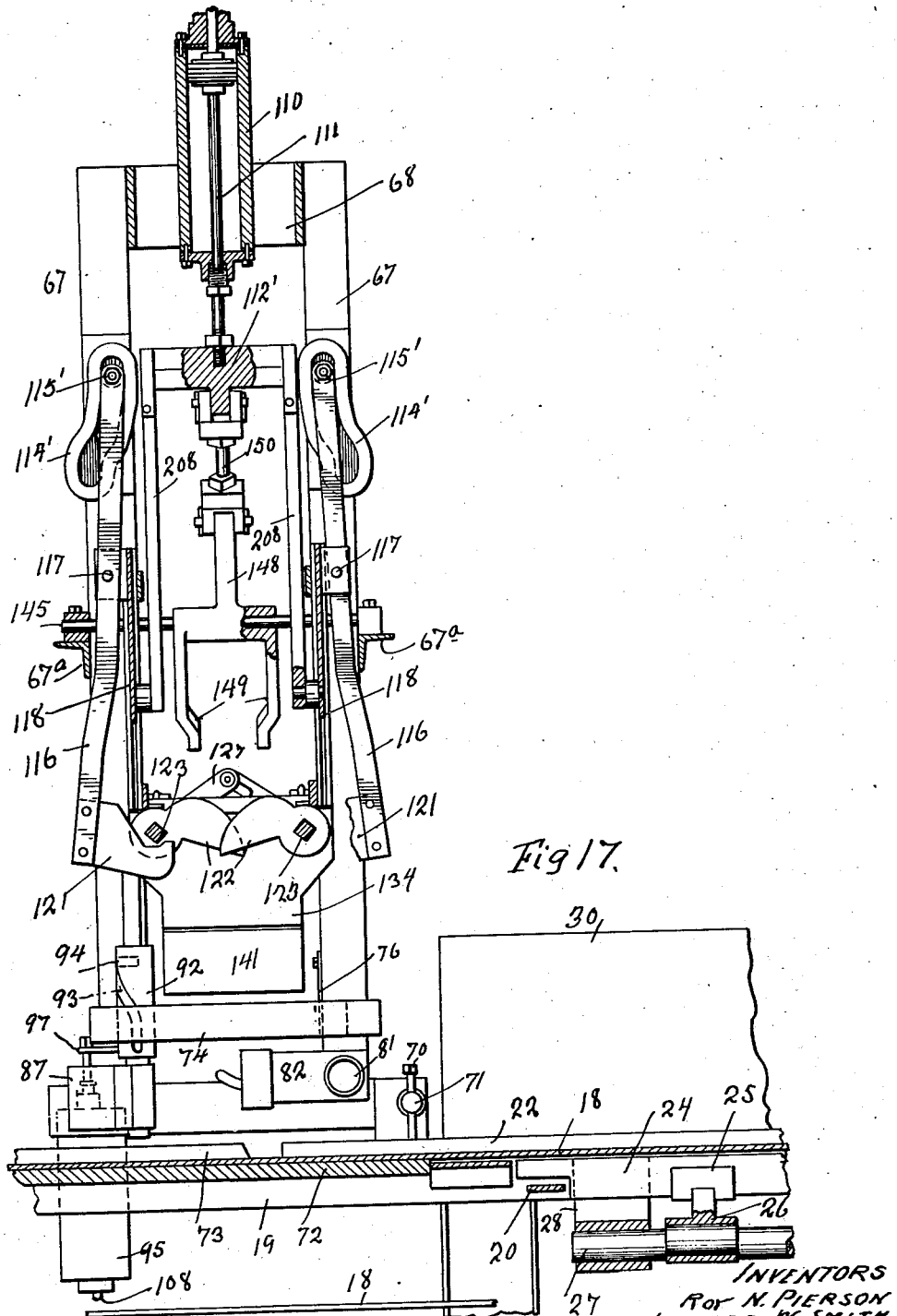
Fig. 17 is a vertical longitudinal section of the mechanism shown in Fig. 16.

The structure illustrated in Figs. 16 and 17 in many respects is identical with that illustrated in Figs. 1 to 15, inclusive, and hence, parts that are identical with the earlier described structure are here indicated by the same characters. In this modified or improved structure illustrated in Figs. 16 and 17, the head applied to the lower end of piston rod 111, in lieu of head 112, is indicated by the character 112' and this head, by links 208, are directly connected to the slides 118 so that the said slides and head 112' are given simultaneous and like vertical movements. Also, in this structure of Figs. 16 and 17, the levers 116 that carry the intucking blades 121 and are pivoted at 117 to lugs on the slides 118, are provided at their upper ends with rollers 115' in lieu of the heretofore noted rollers 115 and these rollers 115' work in cam channels formed in cam blocks or members 114', which latter are rigidly secured to the sides of the frames 67.

The operation of this modified structure in its general effect and in most particulars is like that previously described, but in this modified or improved arrangement the slides 118, which carry the levers 116 vertically, are directly moved from the head 112' and the levers 116 are given their properly timed movements in both directions and the movements in both directions are positive and no spring action is relied upon as in the earlier described construction.

From the foregoing it is evident that while the drawings illustrate a commercially operative machine, which performs all of the functions above stated, in what seems to be a completely satisfactory manner, nevertheless, the various devices and combinations of devices and arrangement of parts are capable of various modifications all within the scope of the invention herein disclosed and desired to be broadly claimed.

What we claim is:

1. In a machine of the kind described, bag intucking mechanism, means for feeding the bags thereto, means for projecting a light beam across the path of movement of the bags, a photo-electric cell subject to said light beam, a circuit including said photo-electric cell and a primary electro-magnetic switch that is closed when the light beam is active on said cell, a circuit including a secondary tripping switch and the contacts of said primary tripping switch, and which secondary switch remains open when the light beam is active on said cell, a circuit including the magnet of a quick-acting electro-magnetic two-way switch and the contacts of said secondary tripping switch, a circuit including the magnet of a slow-release electro-magnetic switch and two of the contacts of said quick-acting two-way switch, a circuit including contacts of said slow release switch and the other two contacts of said two-way switch, and means under the control of said circuits for actuating said intucking mechanism.

2. The structure defined in claim 1 in which said intucking mechanism includes inside and outside tucking devices, a cylinder and piston motor with connections for operating said inside tucking devices, a cylinder and piston motor for operating said outside tucking devices, valve mechanisms for said cylinder piston motors, and electro-magnets in the circuit connection to said switches arranged to operate the valves of said motors with properly timed actions.

3. The structure defined in claim 1 in which said intucking mechanism includes inside and outside tucking devices, a cylinder and piston motor with connections for operating said inside-tucking devices, a cylinder and piston motor for operating said outside tucking devices, valve mechanisms for said cylinder piston motors, and electro-magnets in the circuit connection to said switches arranged to operate the valves of said motors with property timed actions, the said circuit connections further including controlling switches for the valve actuating magnets, and means to be actuated by movements of the piston of the motor which operates the inside tucking devices.

4. In a machine of the kind described, bag intucking mechanism, means for feeding the bags thereto, means for projecting a light beam across the path of movement of the bags, a photo-electric cell subject to said light beam, a circuit including said photo-electric cell and a primary electro-magnetic switch that is closed when the light beam is active on said cell, a circuit including a secondary tripping switch and the contacts of said primary tripping switch, and which secondary switch remains open when the light beam is active on said cell, a circuit including the magnet of a quick-acting electro-magnetic two-way switch and the contacts of said secondary tripping switch, a circuit including the magnet of a slow-release electro-magnetic switch and two of the contacts of said quick-acting two-way switch, a circuit including contacts of said slow release switch and the other two contacts of said two-way switch, said intucking mechanism including inside and outside tucking fingers, a valve-equipped cylinder and piston motor with connections for operating said inside-tucking devices, electro-magnetic valve actuators for the valve mechanisms of said two motors, and circuit connections to said electro-magnetic valve actuators having circuit connections to and controlled by the actions of said electro-magnetic switches.

5. In a machine of the kind described, the combination with bag feeding means, of intucking mechanism comprising a supporting frame overlying the feed belt, outside intucking devices moved and mounted on said frame, a cylinder and piston motor mounted on said frame and having connections for operating said outside intucking devices, inside tucking devices moved and mounted on said frame, a cylinder and piston motor associated with said frame and having connections for operating said inside tucking devices, valve mechanisms directly controlling the actions of said two cylinder and piston motors, and automatic means for operating said valve mechanisms to actuate said outside and inside tucking devices when the sacks reach predetermined position, in respect to the intucking position.

6. The structure defined in claim 5 in further combination with a sack stopping device arranged to be thrown into the path of the moving sacks when the intucking mechanisms are thrown into action.

7. In a machine for intucking the open ends of loaded sacks, a conveyor for the sacks, a frame overlying said conveyor, an upper cylinder anchored to the upper portion of said frame and having a depending piston, an upright lower cylinder anchored in respect to said frame and having an upwardly projecting piston, a transverse rock shaft, inside tucking devices mounted to slide on but to rotate with said rock shaft, laterally movable clamping plates slidable on but not rotatable with said rock shaft, outside intucking fingers, levers carrying the latter and mounted for pivotal and vertical sliding movements on said frame, the piston of said upper cylinder having connections for imparting the vertical and the pivotal movements to said levers, said connections also including clamping levers that are operative on said clamping plates to force the same against the flaps of the sack, and automatic means for controlling the actions of said cylinder piston motors when the sacks are moved to predetermined positions.

8. The structure defined in claim 7 in further combination with valve mechanisms for controlling the supply of motive fluid to said two motors, electro-magnetic valve actuators for said valve mechanisms including controlling circuits with switches therein, electro-magnetic tripping means for said circuits actuated by movements of the sacks to predetermined positions.

9. In a machine for intucking the open ends of loaded sacks, a conveyor for the sacks, a frame overlying said conveyor, an upright rock shaft supported by said frame at one side of the conveyor and provided with an extended normally retracted stop blade, a non-rotary sleeve mounted for sliding movements on said upright rock shaft and having a cam action thereon, a transverse rock shaft, sleeves rotatable with but slidable on said transverse rock shaft and provided with inside tucking fingers, a cylinder which is fixed and the piston of which is connected to said cam-acting sleeve and is connected to said transverse rock shaft for oscillating the same, slides vertically movable on said frame, intucking levers pivoted to said slides and provided at their lower ends with outside intucking fingers, an upper cylinder and piston motor, the cylinder of which is fixed to the upper portion of said frame and provided with a depending piston with connections for imparting vertical and pivotal movements to said intucking levers, said connections also including clamping arms operative when said latter noted piston is depressed to impart approaching movements to said inside intucking fingers, and means for throwing said intucking devices into properly timed actions.

10. The structure defined in claim 7 in which said clamping plates are provided at their lower edges with hinged sections adapted to engage the tops of the sack in the intucking action.

11. The structure defined in claim 7 in which said clamping plates and inside tucking fingers are under yielding strain to separate.

12. The structure defined in claim 7 in which said clamping plates and inside tucking fingers are under yielding strain to separate, and said inside tucking fingers are provided with stop devices that normally limit their separating movements but are engageable with clearance recesses in relatively fixed parts, to permit initial separation when turned to operative positions.

13. In a machine for intucking the open ends of loaded sacks, a conveyor for the sacks, a frame overlying said conveyor, an upper cylinder and piston motor applied to the upper portion of said frame, a lower cylinder and piston motor anchored in respect to the lower portion of said frame, a pair of transverse rock shafts connected for simultaneous oscillation, inside tucking devices mounted to slide on but to rotate with said rock shafts, laterally movable clamping plates slidable on but not rotatable with said rock shafts, intucking levers mounted to slide and oscillate on said frame, and provided at their lower ends with blade-like intucking fingers, connections from the piston of said lower motor for oscillating said rock shafts to turn the inside tucking fingers to operative positions, and connections from the piston of said upper motor for imparting pivotal and sliding movements to said outside intucking arms and for forcing said clamping plates into close association.

14. The structure defined in claim 13 in which said clamping plates and inside clamping fingers are subject to springs tending to force the same outward.

15. The structure defined in claim 13 in which said clamping plates and inside clamping fingers are subject to springs tending to force the same outward, said inside tucking fingers having stop devices which normally limit the separating movement thereof but permit further separation when turned to operative positions.

16. The structure defined in claim 13 in which the connections for pressing the clamping plates into clamping positions include clamping arms movable into and out of engagement with the said clamping plates.

17. The structure defined in claim 13 in which said inside clamping fingers are provided with sleeves directly slidable on said transverse rock shafts and said clamping plates are provided with sleeves that slide upon the pairs of sleeves that carry said inside clamping fingers.

18. The structure defined in claim 13 in which said inside clamping fingers are provided with sleeves directly slidable on said transverse rock shafts and said clamping plates are provided with sleeves that slide upon the pairs of sleeves that carry said inside clamping fingers, said inner sleeves having lugs and bearings for said transverse rock shafts having notches, with which the stop lugs on the outer ends of said inner sleeves engage when the clamping fingers are rotated to operative positions.

19. The structure defined in claim 9 in which the moving elements of said intucking device are actuated by fluid pressure motors having valves controlled by electro-magnetic actuating devices.

20. The structure defined in claim 13 in further combination with a sack stopping device arranged to be thrown into stopping position when the sack is in position for intucking.

21. The structure defined in claim 13 in further combination with a sack stopping device arranged to be automatically thrown into a sack stopping position when the sack reaches the position for intucking.

22. The structure defined in claim 13 in further combination with a sack stopping device arranged to be thrown into stopping position when the sack is in position for intucking, and a sack stopping device arranged to be thrown into sack stopping position to hold the sack in position for intucking while the first noted stop device, by the sack, is projected into a sack stopping position to stop the movement of the oncoming sack.

23. In a bag intucking machine of the kind described, a frame, an actuator head vertically movable on said frame, a pair of spaced slides vertically movable on said head, inside tucking elements mounted for rocking and sliding movements on said frame and engageable with the interior of a bag, connections between said actuator head and said inside tucking elements for imparting both rocking and sliding movements thereto, vertically disposed levers intermediately pivoted to said slides and provided at their lower ends with outside intucking blades or fingers, and cam elements operative on the upper ends of said outside levers for imparting intucking movements to the blades of said levers.

24. In a bag intucking machine of the kind described, a frame, an actuator head vertically movable on said frame, a pair of spaced slides vertically movable on said head, inside tucking elements mounted for rocking and sliding movements on said frame and engageable with the interior of a bag, connections between said actuator head and said inside tucking elements for imparting both rocking and sliding movements thereto, vertically disposed levers intermediately pivoted to said slides and provided at their lower ends with outside intucking blades or fingers, and fixed cams on said frame having cam channels operative on the upper ends of said levers to positively impart intucking and retracting movements to said levers.

25. The structure defined in claim 23 in which the means for imparting sliding movements to said inside tucking elements includes two rocking hubs each having upper and depending arms, the former being connected to said actuating head by links and said depending arms being operative on said inside tucking elements to impart approaching movements thereto.

26. The structure defined in claim 24 in which the means for imparting sliding movements to said inside tucking elements includes two rocking hubs each having upper and depending arms, the former being connected to said actuating head by links and said depending arms being operative on said inside tucking elements to impart approaching movements thereto, said inside tucking elements being under yielding strain to assume normal positions.

27. In a machine of the kind described, bag intucking mechanism, means for feeding bags thereto, means for projecting a light beam across the path of movement of the bags, and means actuated by the projection and interruption of the beam, for controlling the operations of the intucking mechanism, said intucking mechanism including inside and outside fingers and outside clamping plates, said clamping plates having hinged lower portions adapted to fold over the tops of the filled portions of the bags.

28. In a machine of the kind described, bag intucking mechanism, means for feeding bags thereto, means for projecting a light beam across the path of movement of the bags, and means actuated by the projection and interruption of the beam, for controlling the operations of the intucking mechanism, said intucking mechanism including four inside-tucking fingers, two outside clamping plates and two outside tucking fingers, and means for timing the tucking-in actions of the several elements for substantially simultaneous actions, said clamping plates having hinged lower portions.

29. In a machine of the kind described, bag intucking mechanism, means for feeding a continuously driven feed belt for feeding the bags to said intucking mechanism, means for projecting a light beam transversely of said feed belt across the path of movement of the bags, and means including a photo-electric cell subject to said light beam, actuated by the projection and interruption of the beam, for controlling the operations of the intucking mechanism, said intucking mechanism including inside and outside clamping fingers and outside clamping plates, said clamping plates having hinged lower portions adapted to fold over the tops of the filled portions of the bags when said clamping plates are forced together.

30. In a machine of the kind described, bag intucking mechanism, means for feeding a continuously driven feed belt for feeding the bags to said intucking mechanism, means for projecting a light beam transversely of said feed belt across the path of movement of the bags, and means including a photo-electric cell subject to said light beam, actuated by the projection and interruption of the beam, for controlling the operations of the intucking mechanism, said intucking mechanism includes four inside-tucking fingers, two outside clamping plates and two outside intucking fingers, said inside-tucking fingers being mounted for pivotal movements and for lateral movements in the bag intucking action.

31. In a machine of the kind described, bag intucking mechanism, means for feeding a continuously driven feed belt for feeding the bags to said intucking mechanism, means for projecting a light beam transversely of said feed belt across the path of movement of the bags, and means including a photo-electric cell subject to said light beam, actuated by the projection and interruption of the beam, for controlling the operations of the intucking mechanism, said intucking mechanism includes four inside-tucking fingers, two outside clamping plates and two outside intucking fingers, said inside tucking fingers being mounted for pivotal movements and for lateral movements in the bag intucking action, combined with means for timing the intucking actions of the several elements for substantially simultaneous actions.

32. In a machine of the kind described, bag deforming mechanism, continuously driven feed means for delivering the bags to the deforming mechanism, means for projecting a light beam transversely across the path of movement of the bags, a normally inactive bag stopping device for stopping the bags in position in respect to said deforming mechanism, and means including a light sensitive device subject to said light beam and arranged to operatively position said bag stopping device immediately following the passage of a bag through and beyond said light beam.

33. In a machine of the kind described, bag intucking mechanism, means for feeding bags thereto, means for projecting a light beam across the path of movement of the bags, and means actuated by the projection and interruption of the beam, for controlling the operations of the intucking mechanism, and which intucking mechanism includes inside and outside tucking devices, a cylinder and piston motor for actuating the inside-tucking devices, a cylinder and piston motor for actuating the outside tucking devices, valve mechanisms for controlling the operations of said cylinder piston motors, and electro-magnetic circuit connections for operating said valve mechanisms, subject to the control from said light beam.

34. In a machine of the kind described, bag intucking mechanism, means for feeding a continuously driven feed belt for feeding the bags to said intucking mechanism, means for projecting a light beam transversely of said feed belt across the path of movement of the bags, and means including a photo-electric cell subject to said light beam, actuated by the projection and interruption of the beam, for controlling the operations of the intucking mechanism, and which intucking mechanism includes inside and outside tucking devices, a cylinder and piston motor for actuating the inside-tucking devices, a cylinder and piston motor for actuating the outside-tucking devices, valve mechanisms for controlling the operations of said cylinder piston motors, and electromagnetic circuit connections for operating said valve mechanisms, subject to the control from said light beam.

ROY N. PIERSON.
LEONARD W. SMITH.